(12) United States Patent
Seo et al.

(10) Patent No.: US 12,483,666 B2
(45) Date of Patent: Nov. 25, 2025

(54) COLOR PROFILE MODIFICATION BASED ON USER-SPECIFIC COLOR RECOGNITION CHARACTERISTICS

(71) Applicant: Hewlett-Packard Development Company, L.P., Spring, TX (US)

(72) Inventors: Youngsang Seo, Seongnam Si (KR); Haengnan Kim, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/682,749

(22) PCT Filed: Jan. 21, 2022

(86) PCT No.: PCT/US2022/013234
§ 371 (c)(1),
(2) Date: Feb. 9, 2024

(87) PCT Pub. No.: WO2023/018443
PCT Pub. Date: Feb. 16, 2023

(65) Prior Publication Data
US 2024/0267478 A1    Aug. 8, 2024

(30) Foreign Application Priority Data
Aug. 12, 2021   (KR) .................. 10-2021-0106742

(51) Int. Cl.
*H04N 1/60*     (2006.01)
*H04N 1/00*     (2006.01)
(52) U.S. Cl.
CPC ......... *H04N 1/603* (2013.01); *H04N 1/00413* (2013.01); *H04N 1/00472* (2013.01)

(58) Field of Classification Search
CPC ............... H04N 1/603; H04N 1/00413; H04N 1/00472; G09G 5/14; G09G 2380/08; G09G 5/028; G03G 15/5016; G03G 15/55; G03G 2215/00025; G06F 3/0482; G06F 3/04842
See application file for complete search history.

(56) References Cited

U.S. PATENT DOCUMENTS

| 5,677,741 A * | 10/1997 | Yui ...................... H04N 1/6011 348/649 |
| 6,309,117 B1 * | 10/2001 | Bunce .................... A61B 3/066 400/61 |
| 6,873,806 B2 | 3/2005 | Kobayashi et al. |
| 7,605,930 B2 | 10/2009 | Suzuki et al. |
| 8,154,778 B2 | 4/2012 | Patton et al. |

(Continued)

FOREIGN PATENT DOCUMENTS

JP          6733426 B2     7/2020

*Primary Examiner* — Iriana Cruz
(74) *Attorney, Agent, or Firm* — Brooks, Cameron & Huebsch, PLLC

(57) ABSTRACT

An example image forming apparatus includes a storage unit to store color recognition characteristics registered for a plurality of users and a plurality of modification color profiles for compensating each color recognition characteristic, and a processor. The processor, based on a job command for a document of a user being input, is to identify the color recognition characteristics of the user from the storage unit, obtain a modification color profile from the storage unit, and convert the document by using the modification color profile.

15 Claims, 9 Drawing Sheets

(56) References Cited

U.S. PATENT DOCUMENTS

| | | |
|---|---|---|
| 10,594,905 B2 | 3/2020 | Taneda et al. |
| 10,893,173 B2 | 1/2021 | Morovic et al. |
| 2009/0135266 A1 | 5/2009 | Raaymakers et al. |
| 2010/0293458 A1* | 11/2010 | Rolleston ............. H04N 1/6011 |
| | | 715/275 |
| 2014/0240340 A1* | 8/2014 | Shirasawa ............. H04N 1/603 |
| | | 345/590 |
| 2016/0261839 A1 | 9/2016 | Holub |
| 2019/0301941 A1* | 10/2019 | Kawabata ................ H04N 1/46 |
| 2021/0064313 A1* | 3/2021 | Yuki ....................... G03G 15/36 |
| 2022/0171582 A1* | 6/2022 | Higashi ................. G06F 3/1257 |
| 2022/0366131 A1* | 11/2022 | Ekron ................ G06F 16/9538 |

\* cited by examiner

| ADD ADDRESS | | | 310 | 320 |
|---|---|---|---|---|
| NAME | EMAIL ADDRESS | FAX NUMBER | COLOR RECOGNITION CHARACTERISTICS (COLOR PROFILE) | OPTION |
| Tom | Tom@xx.com | 123 | NORMAL ▼ | ▼ |
| | | | RED-WEAK | APPLY BOTH DEFAULT COLOR PROFILE AND MODIFICATION COLOR PROFILE |
| | | | GREEN-WEAK | |
| | | | BLUE-WEAK | |
| | | | RED-BLIND | APPLY ONLY MODIFICATION COLOR PROFILE |
| | | | GREEN-BLIND | |
| | | | BLUE-BLIND | |

COLOR PROFILE MODIFICATION BASED ON USER-SPECIFIC COLOR RECOGNITION CHARACTERISTICS

BACKGROUND

An image forming apparatus may refer to an apparatus which prints print data generated on a terminal apparatus such as a computer on a recording printing medium. Examples of such an image forming apparatus may include a copier, a printer, a facsimile, a scanner, a multi-function peripheral (MFP) serving functions of these in combination as one apparatus, and the like.

BRIEF DESCRIPTION OF THE DRAWINGS

Various examples will be described below by referring to the following figures.

FIG. 4 illustrates an address book input screen according to an example;

DETAILED DESCRIPTION

The examples described below are provided for understanding of the disclosure and it should be understood that the disclosure may be modified and performed variously unlike in the examples described herein.

The terms used in the specification and claims have been selected as general terms in consideration of functions in the specification and claims. But, these terms may vary in accordance with precedent, technical interpretation, the emergence of new technologies, and the like. In addition, there are terms arbitrarily selected by the applicant. Such terms may be interpreted as having meanings defined in this specification and may be interpreted based on general content of the specification and the technical field, if there are no specific term definitions.

In the specification, elements for describing each example of the disclosure are included but there is no limitation thereto. Therefore, some elements may be changed or omitted and other elements may be added. In addition, the elements may be divided and disposed in different independent devices.

In the disclosure, the expression that a certain component is "connected" to another component includes a case where the components are "directly connected to each other", and a case where the components are "connected to each other with another component interposed therebetween". In addition, in a situation in which a certain component "includes" another certain component, it implies that a still another component may be further included, rather than excluding it, unless otherwise noted.

Hereinafter, the disclosure will be described with reference to the accompanying drawings.

Figure 1:
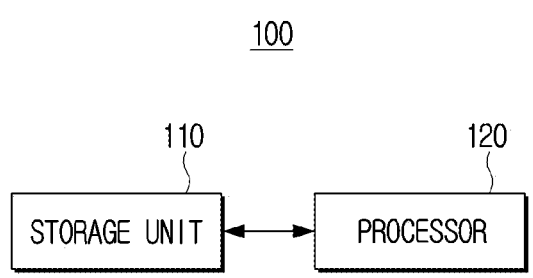
FIG. 1 is a block diagram illustrating an image forming apparatus according to an example.

FIG. 1 is a block diagram illustrating an image forming apparatus according to an example.

Referring to FIG. 1, an image forming apparatus 100 may include a storage unit 110 and a processor 120.

The image forming apparatus 100 may perform various image forming jobs. Examples of the image forming apparatus 100 may include a copier, a printer, a facsimile, a scanner, and a multi-function peripheral (MFP) realizing functions of these as one apparatus in combination, but is not limited thereto.

In the disclosure, an "image forming job" may refer to any of various jobs relating to an image such as forming of an image or generating, saving, or transmitting of an image file (e.g., copying, printing, scanning, or faxing), and the "job" may refer to the image forming job, and also refer to any process for performing the image forming job.

A job command may refer to a command for indicating to start the image forming job. The job command may be input directly by a user through a user interface provided in the image forming apparatus or input through a driver program of an external terminal apparatus connected to the image forming apparatus in a wired or wireless manner. In addition, the job command may be input through various routes.

The user in the disclosure may refer to a person who performs a manipulation related to the image forming job by using the image forming apparatus or a device connected to the image forming apparatus in a wired or wireless manner.

The storage unit 110 is to store various pieces of data and programs used for operations of the image forming apparatus 100. The storage unit 110 may be implemented as a recording medium in the image forming apparatus 100, for example, a hard disk drive (HDD) or a solid-state drive (SSD), and an external storage medium such as a removable disk including a universal serial bus (USB) memory and a web server through a network. The storage unit 110 may store at least one data or instruction used for various examples of the disclosure.

The storage unit 110 may store color recognition characteristics registered for each of a plurality of users and a plurality of color profiles for compensating the color recognition characteristics.

The color recognition characteristics may refer to information associated with recognizing colors. For example, the color recognition characteristics may include characteristics of not being able to normally distinguish colors due to an abnormality in sense of color such as color blindness or color weakness and characteristics of being able to normally distinguish colors.

The color recognition characteristics may include normal, red weakness, green weakness, blue weakness, red blindness, green blindness, blue blindness, total color weakness, or total color blindness but are not limited thereto, and may include various color recognition characteristics for each user.

The color profile is a set of data for implementing characteristics of a color input device or a color output device. In an example, it may be an ICC profile promulgated by the International Color Consortium (ICC). The profiles define color characteristics of a device or show requirements used for mapping definition of a profile connection space.

The color profile may include a default color profile defined as a default for general users instead of color-blind or color-weak users, and a modification color profile for converting color information to compensate for the color recognition characteristics.

According to various examples, the processor 120 may control an operation of the image forming apparatus 100 and may be implemented as a central processing unit (CPU), an application-specific integrated circuit (ASIC), a system on chip (SoC), and the like, but is not limited thereto.

In addition, the processor 120 may perform various operations based on data or instructions stored in the storage unit 110. For example, the processor 120 may execute a program stored in the storage unit 110, read a file stored in the storage unit 110, or store a new file in the storage unit 110.

Based on a job command for a document being input, the processor 120 may identify color recognition characteristics of the user from the storage unit 110. The processor 120 may obtain the modification color profile corresponding to the identified color recognition characteristics from the storage unit 110 and convert the document by using the modification color profile. The job command may be directly input through a user interface provided in the image forming apparatus or input through a terminal apparatus connected to the image forming apparatus.

Figure 2:
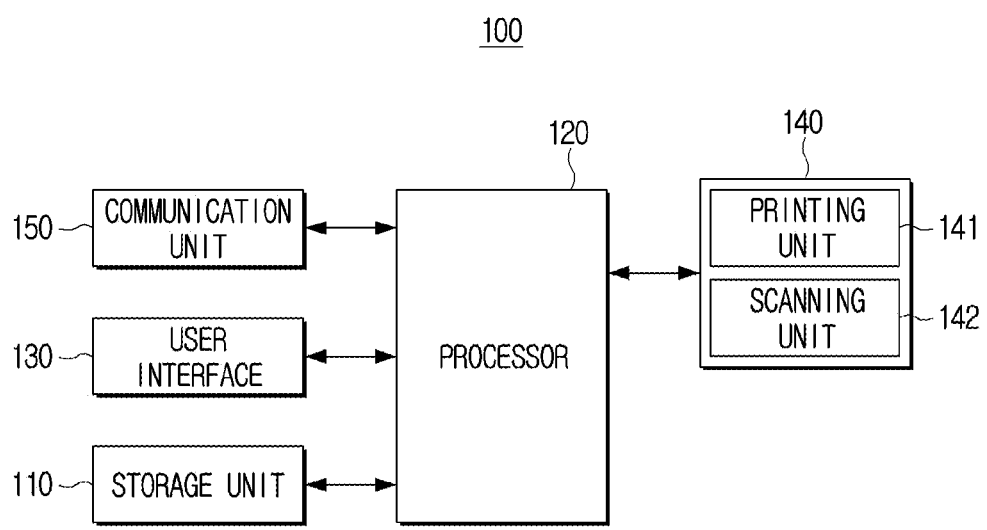
FIG. 2 is a block diagram illustrating the image forming apparatus of FIG. 1 in more detail according to an example.

FIG. 2 is a block diagram illustrating the image forming apparatus of FIG. 1 in more detail according to an example.

Referring to FIG. 2, the image forming apparatus 100 may include the storage unit 110, the processor 120, a user interface 130, an image forming job unit 140, and a communication unit 150.

As described with reference to FIG. 1, the storage unit 110 and the processor 120 may perform an operation for converting the document based on the color recognition characteristics. The user interface 130 is a unit to receive an input of various selection commands from the user. The user interface 130 may include a display panel or at least one button. In this case, the display panel may be implemented as a touch screen.

The user interface 130 may provide various user interface (UI) screens and the user may touch a UI screen directly or manipulate the button provided in the user interface 130 to input various selection commands. The selection commands may include a command for setting various functions of the image forming apparatus 100 or setting a mode change, an operation stop and restart, and the like. In addition, the user interface 130 may directly receive a job command such as a copy command, a fax command, a scan command, or the like.

The image forming job unit 140 may include an element to perform an image forming job such as printing, scanning, copying, or faxing.

It is illustrated that the image forming job unit 140 includes a printing unit 141 and a scanning unit 142. In other examples, the image forming job unit 140 may include other units in addition to or aside from the printing unit 141 and the scanning unit 142.

The printing unit 141 may form an image on a recording medium by various printing methods such as an electrophotographic method, an ink jet method, a thermal transfer method, a thermosensitive type, or the like.

The scanning unit 142 may irradiate a document with light and receive reflected light to read an image recorded on the document.

The communication unit 150 may communicate with another device or network (e.g., local area network (LAN), the Internet, public switched telephone network (PSTN), or the like) in a wired or wireless manner. For this, the communication unit 150 may include a communication module (e.g., a transceiver) which supports at least one among various wired and wireless communication methods. For example, the communication module may be in a chipset type or may be a sticker/barcode (e.g., sticker including a near field communication (NFC) tag) including information used for the communication.

The communication unit 150 may be connected to an external apparatus located outside of the image forming apparatus 100 to transmit and receive a signal or data. The communication unit 150 may transfer a signal or data received from the external apparatus to the processor 120 or transmit a signal or data generated in the processor 120 to the external apparatus. For example, based on the communication unit 150 receiving a print command or print data from the external apparatus, the processor 120 may output the received print data through the printing unit 141.

In an example, the communication unit 150 may be directly connected to a server to transmit and receive a signal or data.

The storage unit 110 may store color recognition characteristics registered for each user, and, based on the job command for the document of the user being input, the processor 120 may identify the color recognition characteristics of the user from the storage unit 110, obtain the color profile corresponding to the identified color recognition characteristics from the storage unit 110, and convert the document by using the obtained color profile.

The job command for the document of the user may refer to a job command for instructing the printing, copying, scanning, faxing, or transmission of the document, but is not limited thereto, and may include various job commands for the document such as document editing, attribute change, and the like.

The color profile corresponding to the color recognition characteristics may be a color profile for compensating the color recognition characteristics.

In a case in which the color recognition characteristic is normal, a default color profile corresponds thereto. In a case in which the color recognition characteristic is red weakness, a modification color profile capable for compensating red weakness corresponds thereto. In a case in which the color recognition characteristic is green weakness, a modification color profile capable for compensating green weakness corresponds thereto. In a case in which the color recognition characteristic is blue weakness, a modification color profile capable for compensating blue weakness corresponds thereto. In a case in which the color recognition characteristic is red blindness, a modification color profile capable for compensating red blindness corresponds thereto. In a case in which the color recognition characteristic is green blindness, a modification color profile capable for compensating green blindness corresponds thereto. In a case in which the color recognition characteristic is blue blindness, a modification color profile capable for compensating blue blindness corresponds thereto. In a case in which the color recognition characteristic is total color weakness, a modification color profile capable for compensating total color weakness corresponds thereto. And in a case in which the color recognition characteristic is total color blindness, a modification color profile capable for compensating total color blindness corresponds thereto.

In addition, in a case in which the color recognition characteristic to which individuality for each user is reflected, it may be stored so that a separate modification color profile for compensating the corresponding color recognition characteristic corresponds thereto.

The processor 120 may output a document to which the modification color profile corresponding to the color recognition characteristic is applied, in consideration of user-specific color recognition characteristic for each user stored in the storage unit 110 based on performing the printing job, copying job, the fax transmission job, or the like.

As an example, based on scanning the document through the scanning unit 142, the processor 120 may identify the user-specific color recognition characteristic stored in the storage unit 110 and apply the modification color profile corresponding to the color recognition characteristic.

The user may directly input the user's own color recognition characteristic or another user's color recognition characteristic based on selecting various options through the user interface 130. Based on creating the user's own account or editing account information, the user's own color recognition characteristic may be directly input. The processor 120 may store the input color recognition characteristic in the storage unit 110.

The color recognition characteristic may be included in a tool storing various pieces of user information such as an address book and may be stored together. Alternatively, the color recognition characteristic may be stored for each user account.

Figure 3:
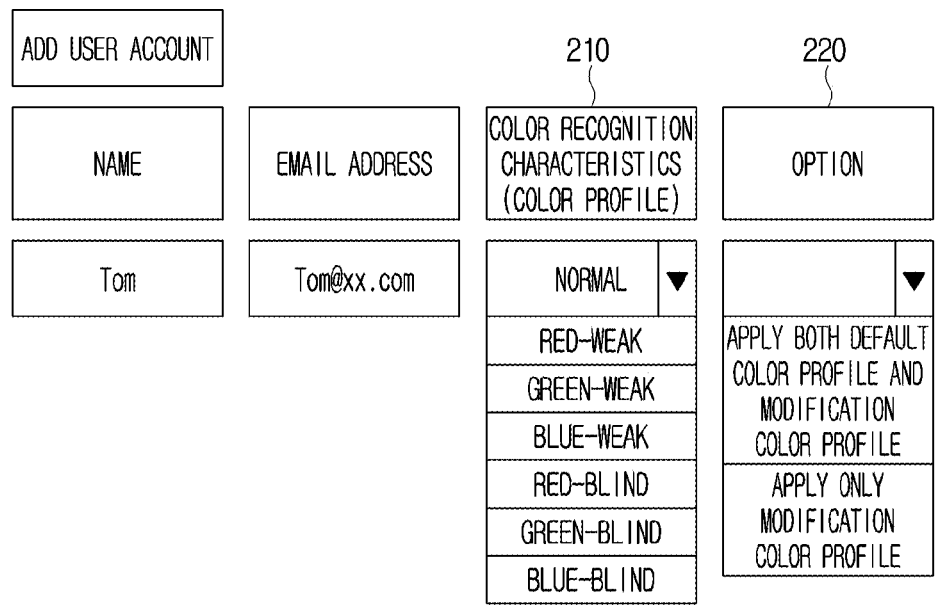
FIG. 3 illustrates an option setting screen for adding a user account according to an example.

FIG. 3 illustrates an option setting screen for adding a user account according to an example. FIG. 3 is an example of a UI screen provided through the user interface 130 in a case of adding a user account directly from the image forming apparatus 100.

If a user command for adding the user account is input, the processor 120 may control the user interface 130 to display an option setting screen 200 as illustrated in FIG. 3. The option setting screen 200 may include a color recognition characteristic region 210 for inputting a color recognition characteristic and an option region 220 capable of selecting whether to provide an original document, in addition to basic information such as a name or an email address associated with the user account.

If the user has a color recognition abnormality, the user may select the color recognition characteristic region 210 and input the user's own color recognition characteristic.

An option region 220 may display a first option for providing a document to which the default color profile is applied and a document to which the modification color profile is applied, a second option for providing the document to which the modification color profile is applied and not providing the document to which the default color profile is applied, and the like. The user may select whether to provide the normally generated document, in addition to the document to which the modification color profile suitable to the user's own color recognition characteristic selected through the color recognition characteristic region 210 is applied, through the option region 220.

FIG. 3 illustrates a state in which the color recognition characteristic region 210 and the option region 220 are activated at the same time. In another example, the option region 220 may be displayed in an inactivated state and may be selectively activated in a situation in which the color recognition abnormality is input in the color recognition characteristic region 210.

The processor 120 may match the color recognition characteristic and the option information input through the option setting screen 200 of FIG. 3 to the user account and store the matched color recognition characteristic, option information, and user account in the storage unit 110.

Based on the job command being input from the user who logged in through the user account, the processor 120 may obtain the color profile corresponding to the color recognition characteristic matched to the user account from the storage unit 110 and perform the job command for converting the document.

In FIG. 3, an example is illustrated in which the user sets whether to obtain the document with the changed color profile and the original document in advance through the option region 220. However, in another example, this may not be set in advance, and a time for selecting it during an image forming job may be provided.

In other words, according to another example, based on the job command being input from a color-blind or color-weak user, the processor 120 may convert the document by using the modification color profile suitable for the user, and control the user interface 130 to display a pop-up screen for inquiring whether to additionally provide a document to which the default color profile is applied, in addition to the converted document.

Based on selecting to additionally provide the document to which the default color profile is applied from the pop-up screen, the processor 120 may obtain the default color profile from the storage unit 110 and additionally generate and provide the document by using the obtained default color profile.

In a case of such an example, the display of the option region 220 on the option setting screen 200 of FIG. 3 may be omitted.

According to still another example, although the user may select the second option for using the modification color profile and not using the default color profile in the option region 220 of the option setting screen 200 of FIG. 3, the pop-up screen described above may be provided in preparation for the case where the user misses the request for the original document by mistake.

FIG. 3 illustrates an example of storing the color recognition characteristic through the option set based on adding the user account. However, the color recognition characteristic of another user may also be stored in advance in addition to the user's own color recognition characteristic. In an example, in a case of an address book, information of a plurality of users may be stored, and accordingly, the color characteristics thereof may be matched and stored in the information.

FIG. 4 illustrates an address book input screen according to an example.

Based on a user command for generating or editing the address book being input, the processor 120 may control the user interface 130 to display an address book input screen 300 as illustrated in FIG. 4. In the address book input screen 300, at least one of the user information and color recognition characteristic of the user may be input.

In the example of FIG. 4, a name, an email address, and a fax number may be input as the user information. However, this is only an example and there is no limitation as to the user information. For example, various user information such as a company, a position, and the like may be included.

In FIG. 4, the color recognition characteristics such as normal, red weakness, green weakness, blue weakness, red blindness, green blindness, and blue blindness may be input in a color recognition characteristic region 310 as the color recognition characteristics. However, there is no limitation thereto, and total color weakness, total color blindness, or various user-specific color recognition characteristics may be included.

The processor 120 may match the user information input through the address book input screen 300 to the color recognition characteristic of the user and register these in the address book of the storage unit 110.

The address book may be used based on scanning the document and transmitting the document to the user or the third party or based on performing fax document transmission or the like. As described above, the command for the job for transmitting the document may be referred to as a document transmission command in this specification. The document transmission command may include a scan command, a fax command, and the like.

Based on the document transmission command being input, the processor 120 may control the user interface 130 to display the address book. Based on the user information for which the document is to be received being selected from the address book, the processor 120 may identify the color recognition characteristics matched to the selected user information from the address book and obtain the color profile corresponding to the identified color recognition characteristic from the storage unit 110. The processor 120 may convert the document by using the obtained color profile and transmit the converted document to the address corresponding to the selected user information.

If the color recognition characteristic matched to the user information identified from the address book is normal, the processor 120 may convert the document by using the default color profile. If the color recognition characteristic matched to the user information identified from the address book is not normal, for example if the color recognition characteristic is red weakness, green weakness, or blue weakness, the processor 120 may convert the document by using the modification color profile.

An option region 320 may also be provided in the address book input screen 300 of FIG. 4. The user may individually select and store whether to provide the original document along with the color recognition characteristic for each person registered in the address book.

Based on a red-weak user, for whom the first option for applying both the default color profile and the modification color profile is set, being selected from the address book, the processor 120 may generate the document to which the modification color profile corresponding to the red weakness is applied and the document to which the default color profile is applied and transmit the documents to the selected user.

As described with reference to FIG. 3, whether to additionally provide the document to which the default color profile is applied may be implemented to be selected through a pop-up screen.

FIGS. 3 and 4 illustrate an example in which the option setting screen is displayed through the user interface 130 provided in the image forming apparatus. However, the option setting screen may be displayed on a terminal apparatus or a server apparatus connected to the image forming apparatus.

Figure 5:
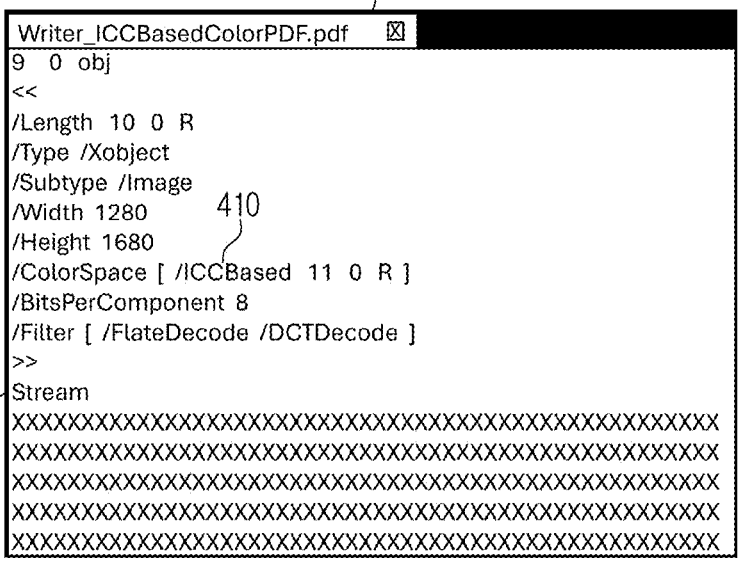
FIG. 5 illustrates a pdf file to which a color profile is applied with a document editor according to an example.

FIG. 5 illustrates a pdf file to which a color profile is applied with a document editor according to an example.

FIG. 5 illustrates an example in which an ICC profile is used as a color profile 400. In the document editor, a title of the applied modification profile (ICC Based 11 0 R) 410 and a data stream part 420 to which the modification color profile is applied may be confirmed. In the example of FIG. 5, the data stream part 420 is written in a computer language and is not displayed in a language readable by a person.

Figure 6:
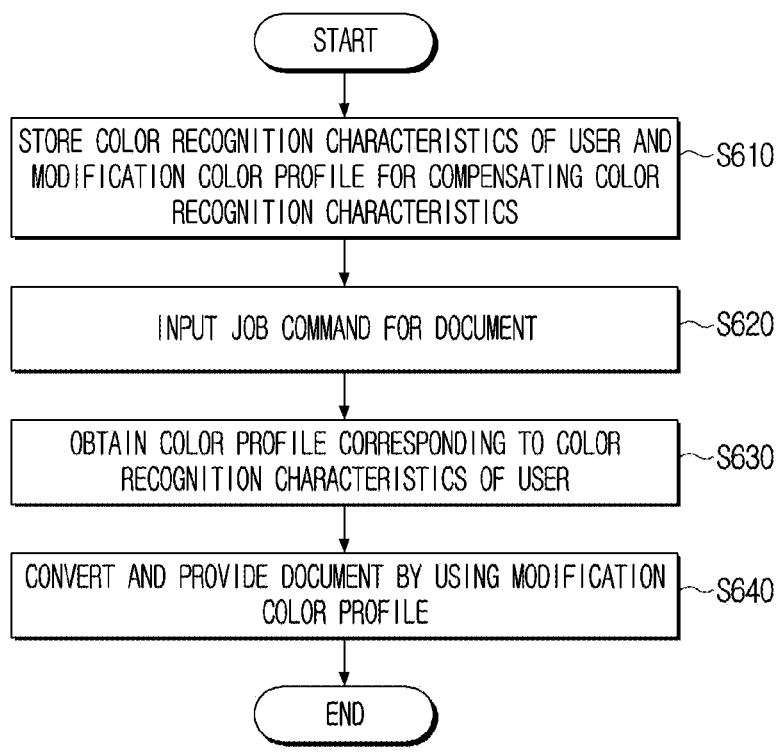
FIG. 6 is a flowchart illustrating a document processing method according to an example.

FIG. 6 is a flowchart illustrating a document processing method according to an example.

Referring to FIG. 6, the document processing method may include storing color recognition characteristics of a user and a color profile for compensating the color recognition characteristics in operation S610. In operation 620, a job command for a document may be input. In operation S630, the color profile corresponding to the color recognition characteristics of the user may be obtained. In operation S640, the document may be converted and provided by using the obtained color profile.

In an example, the image forming apparatus may store the color recognition characteristics of the user and the color profiles for compensating various types of color recognition characteristics, before processing the document.

Examples of the color recognition characteristics and the color profile have been described above, and therefore the overlapped description will not be repeated.

In an example, the color recognition characteristics of the user may be input through the option setting screen displayed on the image forming apparatus. Based on the color recognition characteristics being input while adding the user account, the color recognition characteristics may be matched to the user account and stored.

In an example, the user information and the color recognition characteristics of the user may be input through the address book input screen displayed on the image forming apparatus, and the user information and the color recognition characteristics of the user may be matched to each other, registered in the address book, and stored.

Based on the job command for the document being input, the document may be converted by using the stored color profile corresponding to the color recognition characteristics of the user. If the color recognition characteristics of the user is normal, the default color profile may be used, and if the color recognition characteristics of the user is characteristics other than normal, the modification color profile may be used.

Based on the job command being input from the user who logged in through the user account, the job command may be executed based on the color recognition characteristics stored to be matched to the user account. The logging in through the user account may be performed directly on the image forming apparatus or performed on a terminal apparatus connected to the image forming apparatus. In other words, if the user logs in through the user's own account in a PC connected to the image forming apparatus and inputs a document printing command, the image forming apparatus may print the document by using the color recognition characteristics stored for the account.

In an example, the job command may be various types of document job commands, and this has been described above and therefore the overlapped description will not be repeated.

Based on the job command being the document transmission command, the image forming apparatus may display the address book. Based on the user for whom the document is to be received being selected form the address book, the image forming apparatus may identify the color recognition characteristics matched to the selected user information from the address book, convert the document by using the color profile corresponding to the identified color recognition characteristics, and transmit the converted document to the address corresponding to the selected user information.

On the option setting screen of the image forming apparatus, one of the first option for providing both the document to which the default color profile is applied and the document to which the modification color profile is applied, and the second option for providing the document to which the modification color profile is applied and not providing the document to which the default color profile is applied may be selected and stored. If the first option is selected and stored, in the operation S640 of converting and providing the document, the document to which the default color profile is applied may be additionally provided in addition to the document to which the modification color profile is applied.

If the second option is selected and stored, in the operation S640 of converting and providing the document, the document converted by using the modification color profile may be provided and the document converted using the default color profile may not be provided. In an example, the pop-up screen for inquiring whether to additionally provide the document to which the default color profile is applied may be displayed.

The pop-up screen for inquiring whether to additionally provide the document to which the default color profile is applied may be displayed also in a case where the first option or the second option which is the document providing option is not selected.

Figure 7:
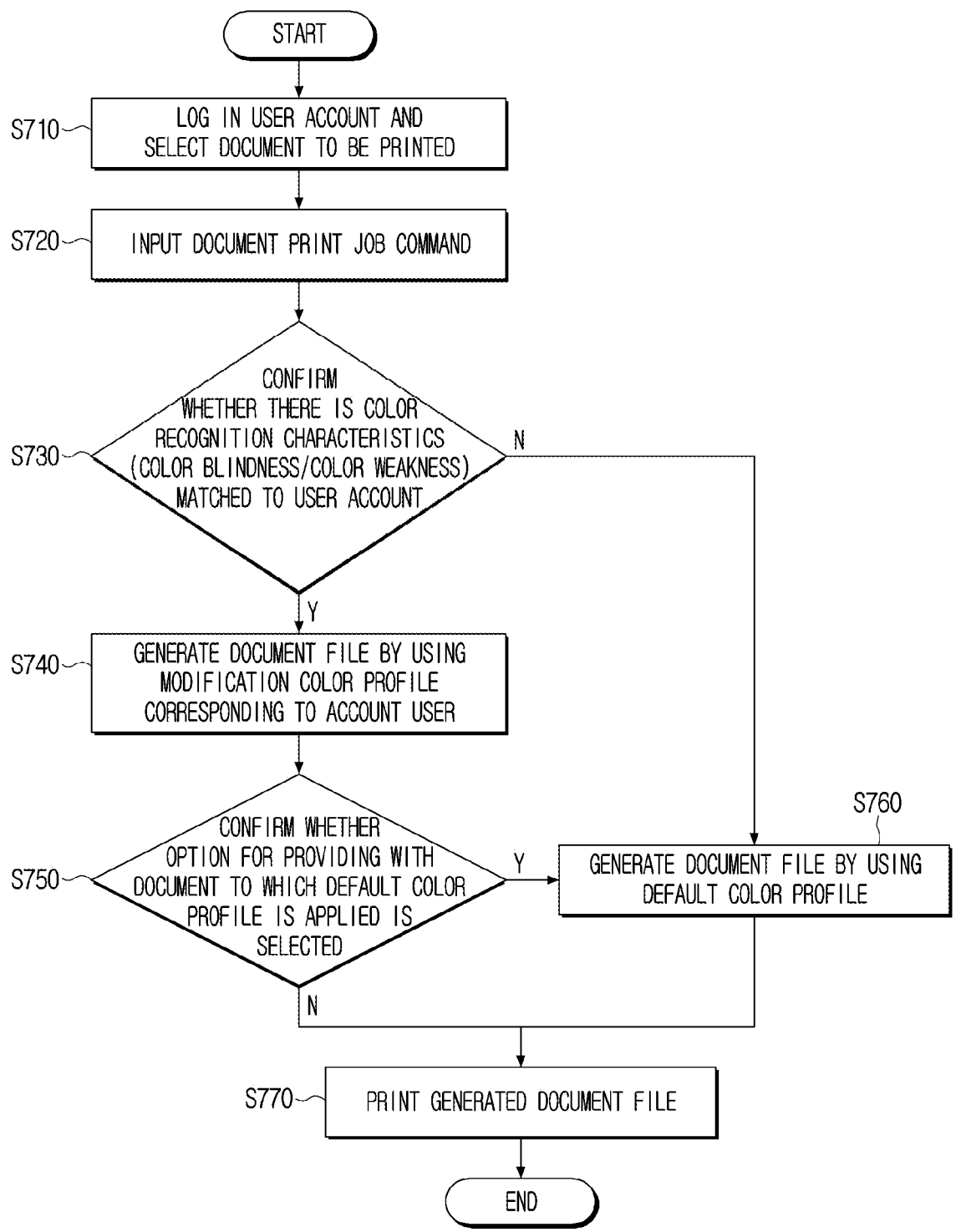
FIGS. 7 and 8 are flowcharts illustrating document processing methods according to various examples.
Figure 8:
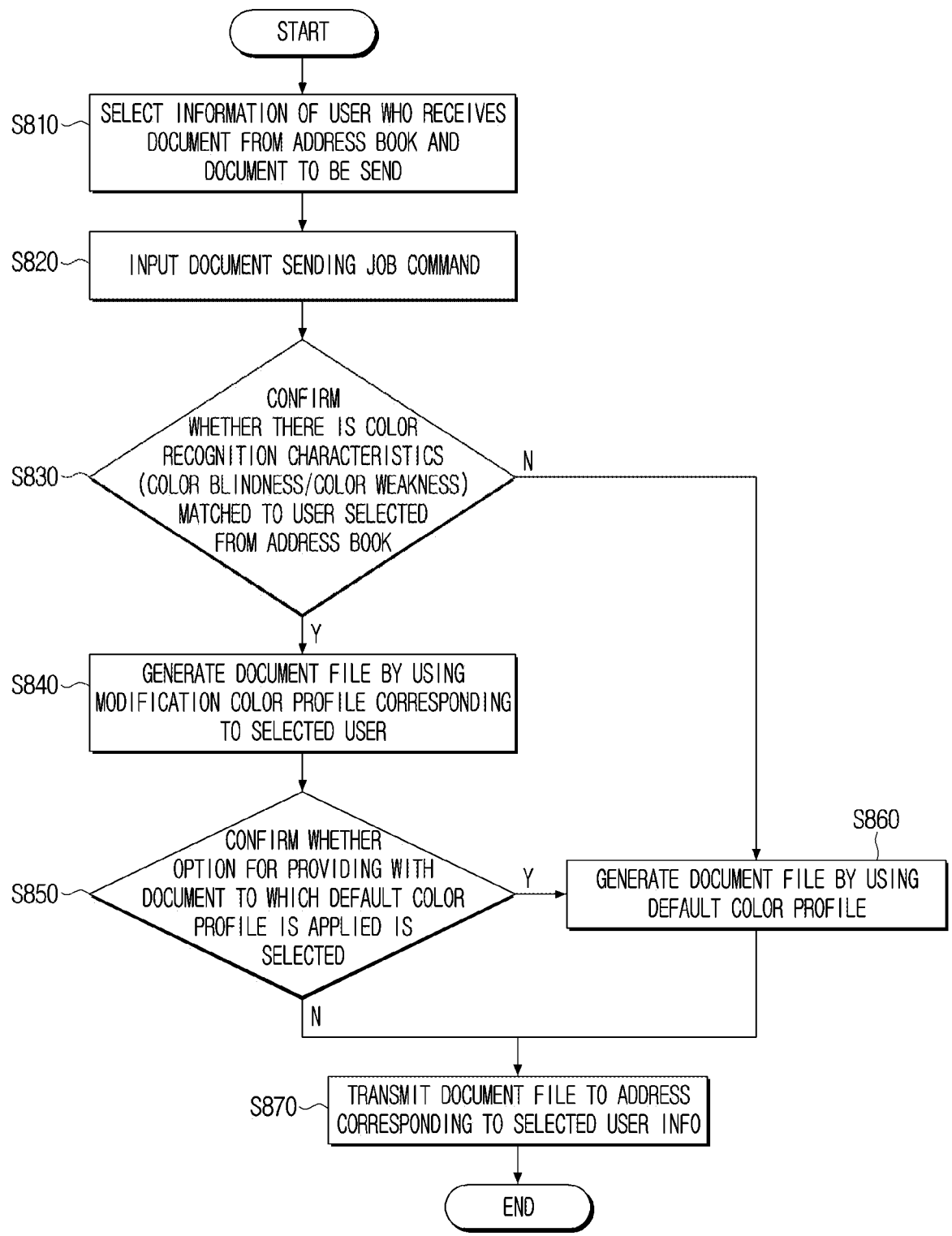

FIGS. 7 and 8 are flowcharts illustrating document processing methods according to various examples.

FIG. 7 is an example of a document processing method in a case where the color recognition characteristics are matched to the user account and stored, and FIG. 8 is an example of the document processing method in a case where the user information and the color recognition characteristics are matched and stored in the address book.

In the document processing method as illustrated in FIG. 7, a user may log in though the user account and select a document to be printed in operation S710. In operation S720, a document to be printed may be sent to a printer based on input of a document print job command. In operation S730, the printer may identify whether there are color recognition characteristics matched to the account of the user who has input the print job command. If there are color recognition characteristics such as color blindness/weakness, the printer may generate a document file by using the modification color profile corresponding to the color recognition characteristics of the user in operation S740. In operation S750, the printer may confirm whether an option for providing the document to which the default color profile is applied together is selected as a separate option in the user account. If the option for providing the document to which the default color profile is applied together is selected, the printer may generate a separate document file by using the default color profile in operation S760. In operation S770, the printer may print a file of the document to which the modification color profile is applied and the document to which the default color profile is applied which are finally generated.

If the color recognition characteristics matched to the user account are normal color recognition characteristics other than the color recognition characteristics such as color blindness/weakness in operation S730, the document file may be generated by using the default color profile in operation S760 and the generated document file may be printed in operation S770.

In addition, if the option for providing the document to which the default color profile is applied together is not selected in the user account in operation S750, the document to which the modification color profile is applied may be generated and printed in operation S770 without generating and printing the document to which the default color profile is applied.

In this case, the image forming apparatus may display the pop-up screen for inquiring whether to additionally provide the document to which the default color profile is applied.

In the document processing method as illustrated in FIG. 8, a user who is to receive a document is selected from the stored address book in operation S810 and a document to be sent to a printer with a document sending job command is input in operation S820. The printer may identify color recognition characteristics matched to the user selected from the address book in operation S830. If there are color recognition characteristics such as color blindness/weakness, the printer may generate a document file by using the modification color profile corresponding to the color recognition characteristics of the selected user in operation S840 and confirm whether an option for providing the document to which the default color profile is applied together is selected as a separate option in the user information of the address book in operation S850. If the option for providing the document to which the default color profile is applied together is selected, the printer may additionally generate a separate document file by using the default color profile in operation S860. The image forming apparatus may transmit a file of the document to which the modification color profile is applied and the document to which the default color profile is applied which are finally generated to the address corresponding to the selected user information in operation S870.

If the color recognition characteristics matched to the user selected from the address book are normal color recognition characteristics other than the color recognition characteristics such as color blindness/weakness in operation S830, the document file may be generated by using the default color profile in operation S860 and the generated document file may be transmitted to the address corresponding to the selected user information in operation S870.

In addition, if the option for providing the document to which the default color profile is applied together is not selected in the user information of the address book in operation S850, the document to which the modification color profile is applied may be generated and transmitted in operation S870 without generating and printing the document to which the default color profile is applied.

In this case, the image forming apparatus may display the pop-up screen for inquiring whether to additionally transmit the document to which the default color profile is applied.

The example document processing methods described with reference to FIGS. 6 to 8 may be performed on the example image forming apparatus as illustrated in FIG. 1, but are not limited thereto. In other words, an image forming apparatus including a configuration not illustrated in FIG. 1 or in which some elements are omitted or changed may perform the document processing methods described above.

According to the various examples of the disclosure, the color profile corresponding to the corresponding color recognition characteristics may be applied based on providing a document by adding the color recognition characteristics of the user based on registering the account or setting the address book, and the original document may be provided along with the modified document.

The examples described above may be implemented in a form of a non-transitory computer-readable recording medium storing a command and data executable by a computer. At least one of the command and data may be stored in a form of an instruction, and in a situation in which it is executed by the processor, a predetermined program module may be generated to perform a predetermined operation.

Figure 9:
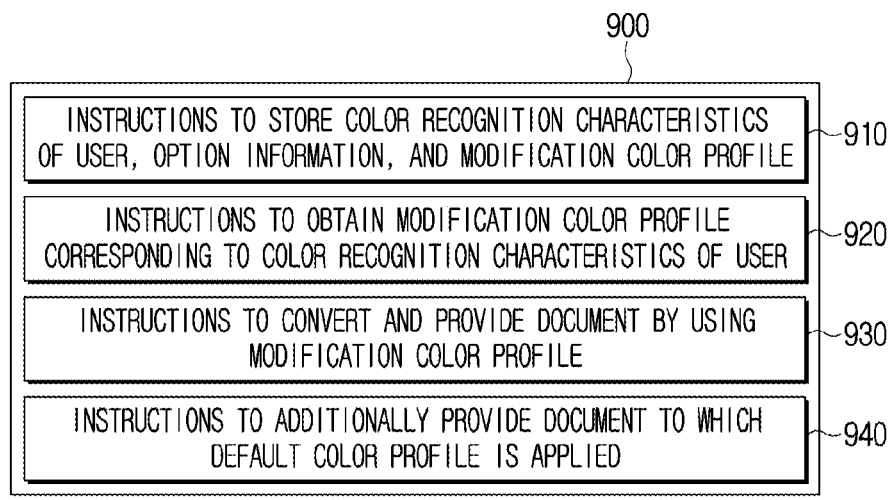
FIG. 9 is a diagram illustrating instructions stored in a non-transitory computer-readable recording medium according to an example.

FIG. 9 is a diagram illustrating instructions stored in a non-transitory computer-readable recording medium according to an example.

A non-transitory computer-readable recording medium 900 may store instructions related to the example operations of the image forming apparatus described above. For example, the non-transitory computer-readable recording medium 900 may include instructions 910 to store color recognition characteristics of a user, option information, and a modification color profile for compensating the color recognition characteristics, instructions 920 to obtain the modification color profile corresponding to the color recognition characteristics of the user, based on a job command for a document being input, instructions 930 to convert and provide the document by using the modification color profile, and instructions 940 to additionally provide a document to which the default color profile is applied, based on an option for providing a document to which the default color profile is applied being set among the option information. Each instruction may be written and recorded in various types of program languages. In addition, an instruction may be combined and stored in a non-transitory recording medium in a form of a machine readable instruction module.

Such a non-transitory computer-readable recording medium may be a read-only memory (ROM), a random-access memory (RAM), a flash memory. CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, a magnetic tape, a floppy disk, a magneto-optical data storage device, an optical data storage device, a hard disk drive, an SSD, and any device capable of storing machine readable instructions, related data, data files, and data structures, and providing machine readable instructions, related data, data files, and data structures to a processor or a computer so that the processor or the computer executes the instructions.

While examples of the disclosure have been shown and described, the disclosure is not so limited, and it is apparent that various modifications can be made without departing from the gist of the disclosure as claimed by the appended claims. Also, it is intended that such modifications are not to be interpreted independently from the technical idea or prospect of the disclosure.

What is claimed is:

1. An image forming apparatus comprising:
   a storage unit to store color recognition characteristics registered for a plurality of users, and a plurality of modification color profiles for compensating each color recognition characteristic; and
   a processor to, based on a job command for a document of a user being input:
      identify the color recognition characteristics of the user from the storage unit,
      obtain a modification color profile corresponding to the identified color recognition characteristics from the storage unit,
      convert the document by using the modification color profile, and
      display, on a user interface, an option setting screen with a first option for providing both a document to which a default color profile is applied and a document to which the modification color profile is applied and a second option for providing the document to which the modification color profile is applied and not providing the document to which the default color profile is applied.

2. The image forming apparatus according to claim 1, wherein the processor is to:
   control the user interface to display the option setting screen,
   based on the first option for providing both the document to which a default color profile is applied and the document to which the modification color profile is applied and the second option for providing the document to which the modification color profile is applied and not providing the document to which the default color profile is applied being selected from the option setting screen, store the selected option information in the storage unit, and
   based on the job command being input, provide at least one of the document to which the default color profile is applied and the document to which the modification color profile is applied based on the option information stored in the storage unit.

3. The image forming apparatus according to claim 1, wherein the processor is to:
   control the user interface to display the option setting screen,
   match the color recognition characteristics input through the option setting screen to a user account and store the color recognition characteristics matched to the user account in the storage unit, and
   based on the job command being input from a user who logs in through the user account, execute the job command based on the color recognition characteristics matched to the user account.

4. The image forming apparatus according to claim 1, wherein the processor is to control the user interface to display a pop-up screen for inquiring whether to additionally provide the document to which the default color profile is applied, in addition to a document converted by using the modification color profile.

5. The image forming apparatus according to claim 1, wherein the processor is to:
   control the user interface to display an address book input screen, and
   based on user information and the color recognition characteristics of the user being input from the address book input screen, match the user information and color recognition characteristics of the user to each other and register the user information matched to the color recognition characteristics of the user in an address book of the storage unit.

6. The image forming apparatus according to claim 5, wherein the processor is to:
   based on the job command being a document transmission command, control the user interface to display the address book, and
   based on information of a user for whom a document is to be received being selected from the address book, identify color recognition characteristics matched to the selected user information from the address book, obtain a modification color profile corresponding to the identified color recognition characteristics from the storage unit, convert the document by using the modification color profile, and transmit the converted document to an address corresponding to the selected user information.

7. A document processing method of an image forming apparatus, the method comprising:
   storing color recognition characteristics of a user and a modification color profile for compensating the color recognition characteristics;
   based on a job command for a document being input, obtaining the modification color profile corresponding to the color recognition characteristics of the user;
   converting the document by using the modification color profile and providing the document, and
   displaying, on a user interface, an option setting screen with a first option for providing both a document to which a default color profile is applied and a document to which the modification color profile is applied and a second option for providing the document to which the modification color profile is applied and not providing the document to which the default color profile is applied.

8. The document processing method according to claim 7, further comprising:
storing selected option information based on one of the first option for providing both a document to which a default color profile is applied and a document to which the modification color profile is applied and the second option for providing the document to which the modification color profile is applied and not providing the document to which the default color profile is applied being selected from an option setting screen.

9. The document processing method according to claim 8, further comprising:
based on the first option being selected, applying the default color profile to the document and providing the document separately from the document to which the modification color profile is applied.

10. The document processing method according to claim 8, further comprising:
based on the second option being selected, applying the document color profile to the document and providing the document; and
displaying a pop-up screen for inquiring whether to additionally provide the document to which the default color profile is applied.

11. The document processing method according to claim 7, further comprising:
matching the color recognition characteristics input through an option setting screen to a user account and storing the color recognition characteristics; and
based on the job command being input from a user who logs in through the user account, executing the job command based on the color recognition characteristics matched to the user account.

12. The document processing method according to claim 7, further comprising:
displaying a pop-up screen for inquiring whether to additionally provide the document to which the default color profile is applied, in addition to a document converted by using the modification color profile.

13. The document processing method according to claim 7, further comprising:
displaying an address book input screen; and
based on user information and color recognition characteristics of the user being input from the address book input screen, matching the user information and color recognition characteristics of the user to each other and registering the user information matched to the color recognition characteristics of the user in the address book.

14. The document processing method according to claim 13, further comprising:
based on the job command being a document transmission command, displaying the address book;
based on information of a user for whom a document is to be received being selected from the address book, identifying color recognition characteristics matched to the selected user information from the address book;
converting the document by using the modification color profile corresponding to the identified color recognition characteristics; and
transmitting the converted document to an address corresponding to the selected user information.

15. A non-transitory computer-readable recording medium storing instructions for performing a document processing method of an image forming apparatus, the non-transitory computer-readable recording medium comprising:
instructions to store color recognition characteristics of a user, option information, and a modification color profile for compensating the color recognition characteristics;
instructions to, based on a job command for a document being input, obtain a modification color profile corresponding to the color recognition characteristics of the user;
instructions to convert the document by using the modification color profile and provide the document; and
instructions to, display an option setting screen with a first option for providing both a document to which a default color profile is applied and a document to which the modification color profile is applied and a second option for providing the document to which the modification color profile is applied and not providing the document to which the default color profile is applied.

* * * * *